(12) United States Patent
Watanabe et al.

(10) Patent No.: US 12,240,678 B2
(45) Date of Patent: Mar. 4, 2025

(54) BAG-LIKE CONTAINER

(71) Applicant: DAIWA CAN COMPANY, Tokyo (JP)

(72) Inventors: Saki Watanabe, Sagamihara (JP); Tomoyuki Murakami, Sagamihara (JP); Shinichirou Kanamori, Sagamihara (JP); Kana Hashimoto, Sagamihara (JP)

(73) Assignee: Daiwa Can Company, Tokyo (JP)

( * ) Notice: Subject to any disclaimer, the term of this patent is extended or adjusted under 35 U.S.C. 154(b) by 870 days.

(21) Appl. No.: 16/831,075

(22) Filed: Mar. 26, 2020

(65) Prior Publication Data
US 2020/0223615 A1 Jul. 16, 2020

Related U.S. Application Data

(63) Continuation of application No. PCT/JP2018/035564, filed on Sep. 26, 2018.

(30) Foreign Application Priority Data

Sep. 29, 2017 (JP) .................................. 2017-190666

(51) Int. Cl.
*B65D 81/32* (2006.01)
*B32B 1/00* (2006.01)
(Continued)

(52) U.S. Cl.
CPC ............ *B65D 81/3461* (2013.01); *B32B 1/00* (2013.01); *B32B 27/10* (2013.01); *B65D 75/30* (2013.01);
(Continued)

(58) Field of Classification Search
CPC ............ B65D 81/3461; B65D 81/3469; B65D 81/3446; B65D 81/34; B65D 81/3453
See application file for complete search history.

(56) References Cited

U.S. PATENT DOCUMENTS

| 4,735,513 A   | 4/1988 | Watkins et al. |
| 4,865,921 A * | 9/1989 | Hollenberg ............. B32B 27/06 428/688 |

(Continued)

FOREIGN PATENT DOCUMENTS

| JP | 57107774   | 7/1982 |
| JP | H1171258 A | 3/1999 |

(Continued)

OTHER PUBLICATIONS

Japanese Office Action dated Nov. 9, 2021 for Japanese Patent Application No. 2017-190666 (with English translation) (8 pages).
(Continued)

*Primary Examiner* — Jes F Pascua
*Assistant Examiner* — Nina K Attel
(74) *Attorney, Agent, or Firm* — Harness, Dickey & Pierce, P.L.C.

(57) ABSTRACT

A bag-like container includes a bottom sheet including a first paper base layer and a heating element layer configured to generate heat by absorbing electromagnetic waves; and a top sheet bonded to the bottom sheet in such a manner as to be
(Continued)

separable from the bottom sheet with a content to be cooked being contained, wherein the top sheet transmits the electromagnetic waves.

4 Claims, 6 Drawing Sheets

(51) Int. Cl.
   *B32B 27/10* (2006.01)
   *B65D 75/30* (2006.01)
   *B65D 81/34* (2006.01)

(52) U.S. Cl.
   CPC ....... *B32B 2439/46* (2013.01); *B32B 2439/70* (2013.01); *B65D 2581/3472* (2013.01)

(56) References Cited

U.S. PATENT DOCUMENTS

| | | | | |
|---|---|---|---|---|
| 4,985,606 | A * | 1/1991 | Faller | B65D 81/3446 |
| | | | | 219/730 |
| 5,180,894 | A * | 1/1993 | Quick | B65D 81/3461 |
| | | | | 219/730 |
| 5,489,766 | A * | 2/1996 | Walters | B65D 81/3461 |
| | | | | 219/730 |
| 5,952,025 | A * | 9/1999 | Yannuzzi, Jr. | B31B 70/88 |
| | | | | 53/469 |
| 6,414,288 | B1 | 7/2002 | Bono et al. | |
| 2007/0039951 | A1 * | 2/2007 | Cole | B65D 81/3893 |
| | | | | 219/725 |
| 2009/0242550 | A1 * | 10/2009 | Schneider | B65D 51/1633 |
| | | | | 219/730 |
| 2010/0195939 | A1 | 8/2010 | Tucker | |
| 2014/0339105 | A1 * | 11/2014 | Czarny | B65D 75/366 |
| | | | | 206/204 |

FOREIGN PATENT DOCUMENTS

| | | |
|---|---|---|
| JP | H11171258 A | 6/1999 |
| JP | H11208740 A | 8/1999 |
| JP | 2001322684 A | 11/2001 |
| JP | 2003505301 A | 2/2003 |
| JP | 2005255250 A | 9/2005 |
| JP | 2007253986 A | 10/2007 |
| WO | WO-0105678 A1 | 1/2001 |

OTHER PUBLICATIONS

English translation of International Preliminary Report on Patentability for International Application No. PCT/JP2018/035564 dated Mar. 31, 2020 (7 Pages).
Taiwanese Office Action dated Dec. 1, 2021 for Application No. 107134026 with English translation (8 pages).
International Search Report for PCT/JP2018/035564 (with English translation) dated Dec. 11, 2018 (5 pages).
Extended European Search Report for Application No. 18863197.2 dated May 18, 2021 (7 pages).
Japanese Final Office Action dated May 31, 2022 (with English translation) for Application No. 2017-190666 (10 pages).

* cited by examiner

|  | Comparative example 1 | Example 1 | Comparative example 2 | Example 2 |
|---|---|---|---|---|
| Basis weight | 35g / m² | 64g / m² | 66g / m² | 66g / m² |
| Layered structure | PET/paper/susceptor | Paper/PET/susceptor | PET/paper/susceptor | Paper/susceptor |
| Film state after heating |  Wrinkle |  Large curl |  Wrinkle |  Large curl |
| Browned surface | × | ○ | △ | ○ |
| Feel of crispiness | ○〜△ | ○〜△ | ○〜△ | ○〜△ |

|  | Example 3 | Example 4 | Example 5 | Example 6 |
|---|---|---|---|---|
| Basis weight | 70g / m² | 120g / m² | 140g / m² | 280g / m² |
| Layered structure | Paper/PE/PET/susceptor | Paper/susceptor | Paper/PE/PET/susceptor | Paper/PP/susceptor |
| Film state after heating |  Medium curl |  Medium curl |  Small curl |  Small curl |
| Browned surface | ○ | ○ | ○ | ○ |
| Feel of crispiness | ○〜△ | ○ | ○ | ○ |

BAG-LIKE CONTAINER

CROSS-REFERENCE TO RELATED APPLICATIONS

This is a Continuation Application of PCT application No. PCT/JP2018/035564, filed Sep. 26, 2018, which was published under PCT Article 21(2) in Japanese, the entire contents of which are incorporated herein by reference.

This application is based upon and claims the benefit of priority from Japanese Patent Application No. 2017-190666, filed Sep. 29, 2017, the entire contents of which are incorporated herein by reference.

BACKGROUND

Field

The present invention relates to a bag-like container configured to contain food to be cooked with a microwave oven.

Description of the Related Art

For microwave cooking, a bag-like container is provided with a heating element that generates heat when heated with a microwave oven so that food can be cooked until browned, and bag-like containers of this type have been variously proposed. Jpn. Pat. Appln. KOKAI Publication No. 2001-322684 discloses a bag-like container of this type, in which a heating element layer is provided on one face of a heat-sealing polyester film and the container is shaped like a bag so as to brown a surface of the food.

BRIEF SUMMARY OF THE INVENTION

However, a container composed mainly of a resin film such as that described above has a risk that the resin film will be damaged from heat generated by a heating element at the time of microwave cooking.

Under these circumstances, the present invention aims to provide a bag-like container that can be prevented from becoming damaged from heat generated by a heating element when a content is cooked with a microwave oven.

According to one aspect of the present invention, a bag-like container includes a bottom sheet including a first paper base layer and a heating element layer configured to generate heat by absorbing electromagnetic waves; and a top sheet bonded to the bottom sheet in such a manner as to be separable from the bottom sheet with a content to be cooked being contained, wherein the top sheet transmits the electromagnetic waves.

DETAILED DESCRIPTION

Hereinafter, a bag-like container 1 according to one embodiment of the present invention will be described with reference to FIG. 1 to FIG. 7.

Figure 1:
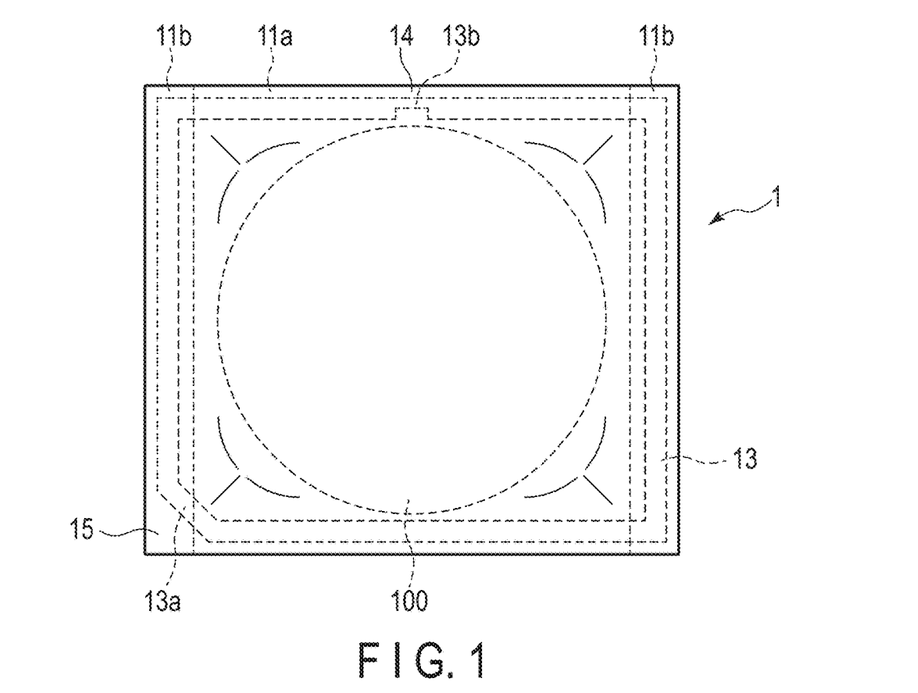
FIG. 1 is a plan view showing a configuration of a bag-like container according to one embodiment of the present invention.
Figure 2:
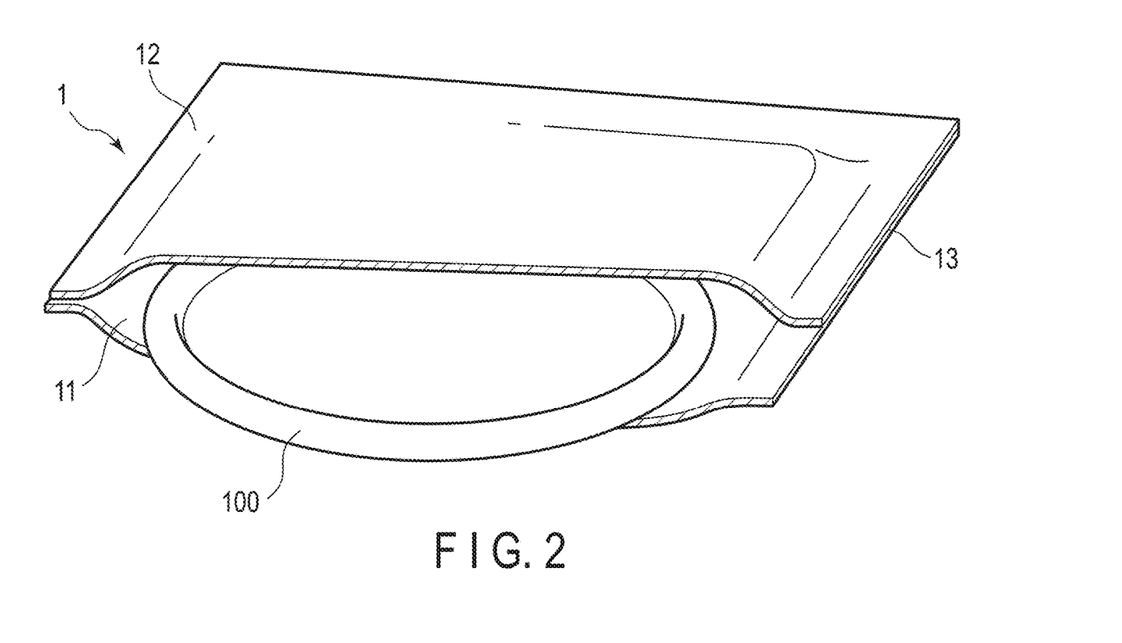
FIG. 2 is a perspective view showing the configuration of the bag-like container partially cut away.
Figure 3:
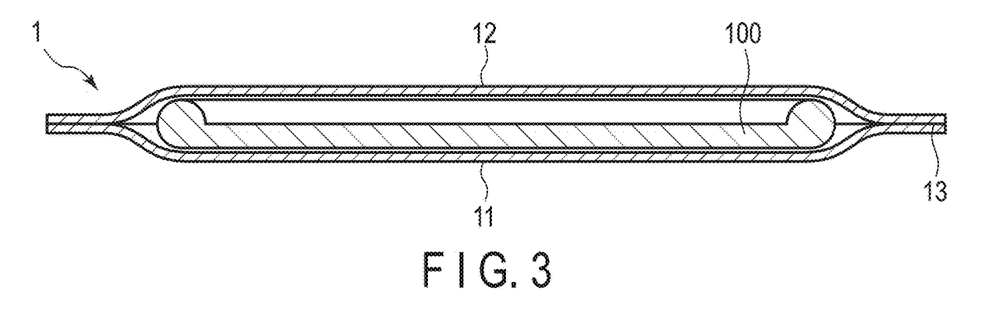
FIG. 3 is a cross-sectional view of the configuration of the bag-like container.
Figure 4:
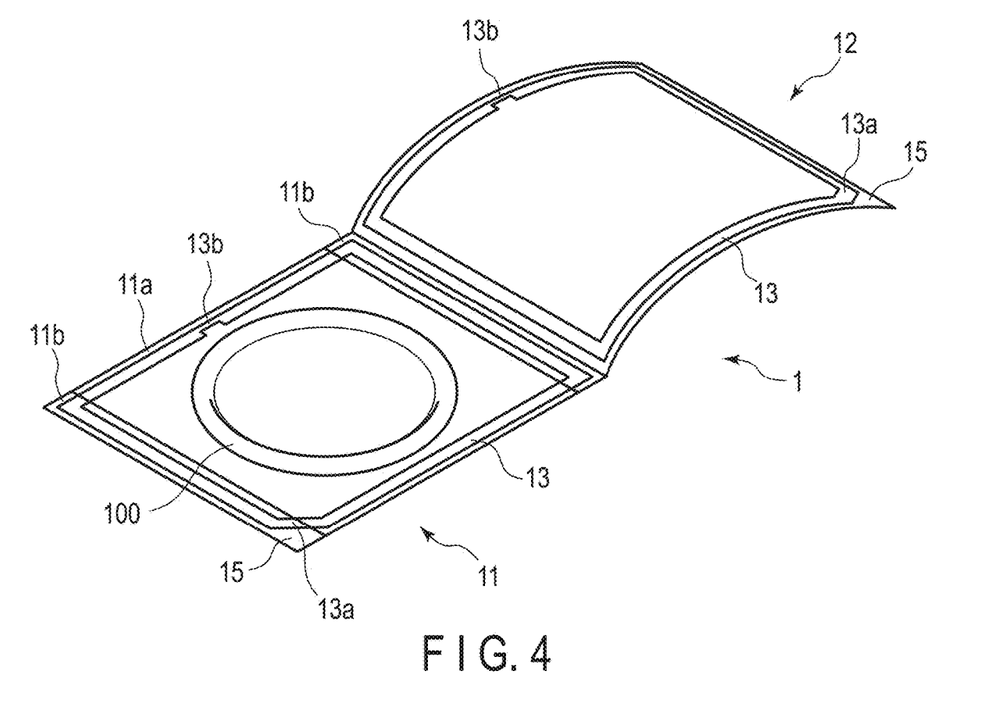
FIG. 4 is a perspective view showing the configuration of the bag-like container in one example of use.
Figure 5:
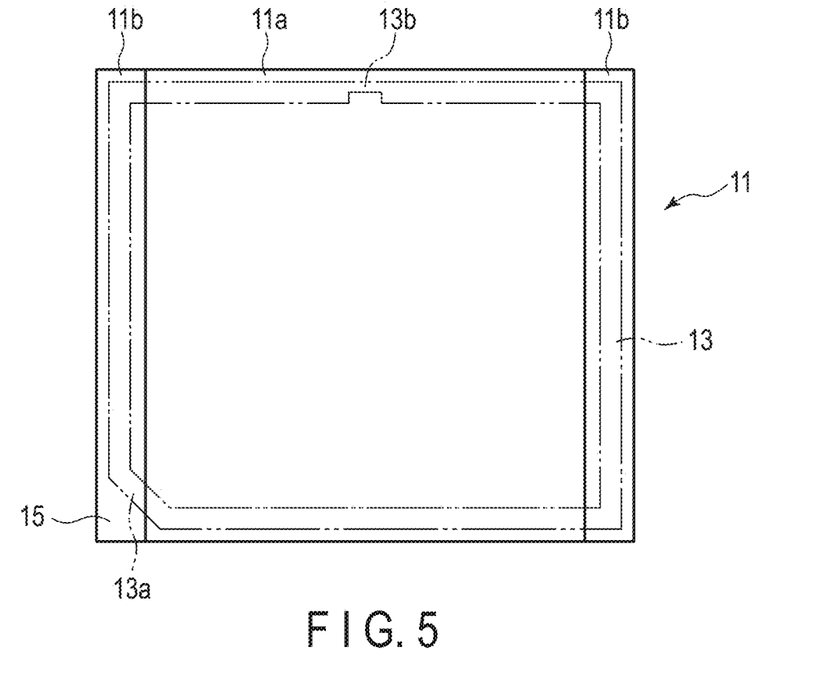
FIG. 5 is a plan view showing a configuration of a bottom sheet for use in the bag-like container.
Figure 6:
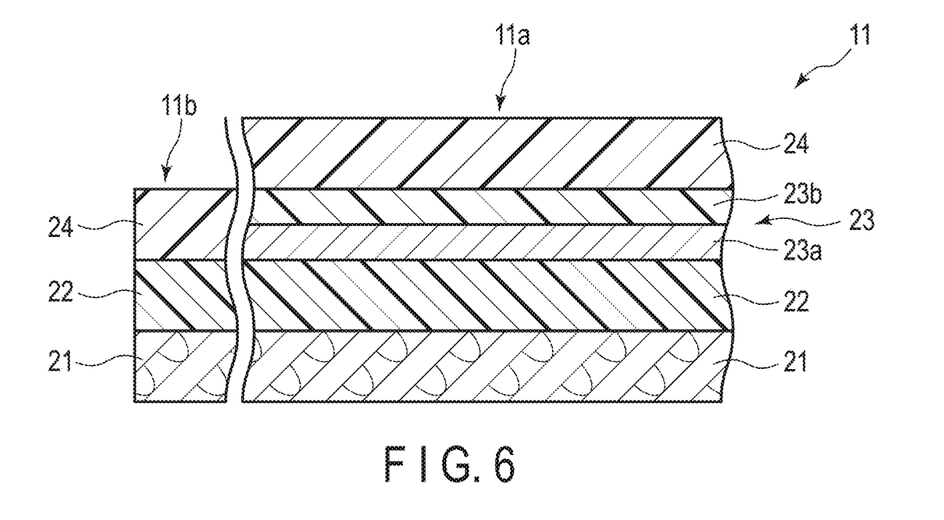
FIG. 6 is a cross-sectional view showing the configuration of the bottom sheet.
Figure 7:
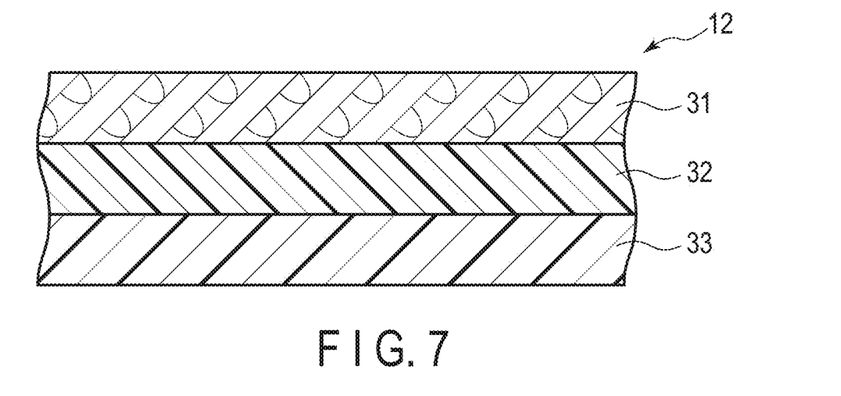
FIG. 7 is a cross-sectional view showing a configuration of a top sheet for use in the bag-like container.

FIG. 1 to FIG. 3 are respectively a plan view, a perspective view, and a cross-sectional view which each show a configuration of the bag-like container 1 according to one embodiment of the present invention. FIG. 4 is a perspective view showing the configuration of the bag-like container 1 in one example of use. FIG. 5 is a plan view showing a configuration of a bottom sheet 11 for use in the bag-like container 1. FIG. 6 is a cross-sectional view showing the configuration of the bottom sheet 11. FIG. 7 is a cross-sectional view showing a configuration of a top sheet 12 for use in the bag-like container 1.

As shown in FIG. 1 to FIG. 3, the bag-like container 1 is a storage container used to heat a content 100 that is food when it is cooked with a microwave oven, and to scorch or brown the content 100. Examples of the content 100 include a pizza, a rice ball, fried rice, okonomiyaki, grilled fish, etc.

The bag-like container 1 includes the bottom sheet 11 and the top sheet 12, which is fixed to the bottom sheet 11, with the content 100 being held between the bottom sheet 11 and the top sheet 12. The bag-like container 1 is formed into a bag shape by thermally welding the bottom sheet 11 and the top sheet 12 together. With the content 100 being contained and closely sealed in the bag-like container 1, the bag-like container 1 has a seal portion 13 that extends along the periphery of the bottom sheet 11 and the top sheet 12, and a steam release portion 14 that releases internal steam when internal pressure increases at the time of cooking.

The bottom sheet 11 has a multi-layered structure made of a plurality of materials, and is formed into, e.g., a rectangular sheet shape. The bottom sheet 11 includes a heating portion 11a and a non-heating portion 11b, as shown in FIG. 1 and FIG. 4 to FIG. 6. The heating portion 11a is provided throughout the region of the bottom sheet 11, except at the opposed margins thereof. The non-heating portion 11b is provided in the pair of opposed margins of the bottom sheet 11.

Next, a layered structure of the bottom sheet 11 will be described with reference to FIG. 6 and FIG. 7. As shown in FIG. 6, the heating portion 11a of the bottom sheet 11 includes a first paper base layer 21, a first resin film layer 22, a heating element layer 23, and a first seal layer in order of distance from the outer face side of the bottom sheet 11 when viewed as a part of the bag-like container 1. The heating portion 11a is configured in a manner such that the heating portion 11a can generate heat by absorbing electromagnetic waves such as microwaves emitted by a microwave oven.

The first paper base layer 21 is made of a paper base material composed mainly of paper. For example, the first paper base layer 21 has a printed surface on the outer face side of the bag-like container 1, and this printed surface is overcoated with paint in order to secure a waterproofing property.

The first resin film layer 22 is provided on the first paper base layer 21, on the side closer to the inner face of the bag-like container 1. The first resin film layer 22 is made of, e.g., a PET film. The first resin film layer 22 may be a single layer or may have a multi-layered structure in which resin layers of the same kind or various kinds are stacked together. For the first resin film layer 22, for example a thermoplastic resin film made of, e.g., an olefin-based resin such as polyethylene or polypropylene, a polyester-based resin such as polyethylene terephthalate, or a polyamide-based resin such as nylon 6 is used.

The heating element layer 23 includes a metal evaporated film 23a and a protection layer 23b. The metal evaporated film 23a is evaporated on the first resin film layer 22, on the side closer to the inner face of the bag-like container 1. The protection layer 23b is made of a resin coating film on the metal evaporated film 23a, on the side closer to the inner face of the bag-like container 1.

The metal evaporated film 23a is made of, e.g., a mixture of aluminum and aluminum oxide. The metal evaporated film 23a may be a thin film of an evaporated film, conductive ink, a metal foil, etc., made of a conducting substance that generates heat by absorbing microwaves. Examples of a conducting substance include a metal such as aluminum, tin, zinc, iron, copper, etc., and a mixture of one type or two or more types of oxides of these metals.

The protection layer 23b is made of, e.g., vinyl chloride-polyvinyl acetate-based resin. The protection layer 23b is necessary for the metal evaporated film 23a to be formed on a part of the bottom sheet 11. As a specific example, the protection layer 23b is for the metal evaporated film 23a, which is formed throughout the face of the first resin film layer 22, to be formed on a part of the bottom sheet 11 by forming the protection layer 23b on a part of the metal evaporated film 23a, and removing the remaining part of the metal evaporated film 23a, on which the protection layer 23b is not formed. When the metal evaporated film 23a is formed throughout the face of the bottom sheet 11, therefore, the protection layer 23b may not be provided.

The first seal layer 24 is provided on the protection layer 23b, on the side closer to the inner face of the bag-like container 1. The first seal layer 24 is made of, e.g., a resin material having a thermal adhesion property. For example, the first seal layer 24 is made of a sealant film. A preferable example of a resin material that forms the first seal layer 24 made of a sealant film is an olefin-based resin such as a polyethylene resin or a polypropylene resin.

As shown in FIG. 6, the non-heating portion 11b of the bottom sheet 11 includes the first paper base layer 21, the first resin film layer 22, and the first seal layer 24 in order of distance from the outer face side of the bottom sheet 11 when viewed as a part of the bag-like container 1. Specifically, the non-heating portion 11b corresponds to the heating portion 11a with no metal evaporated film 23a, nor the protection layer 23b. Thus, the non-heating portion 11b is configured to transmit electromagnetic waves emitted by a microwave oven.

In the heating portion 11a of the bottom sheet 11 thus configured, the first paper base layer 21 and the first resin film layer 22 are bonded together with adhesive, while the protection layer 23b and the first seal layer 24 are bonded together with adhesive.

The top sheet 12 has a multi-layered structure made of a plurality of materials, and is formed into the same shape as the bottom sheet 11 when viewed in a planar view, for example, a rectangular sheet shape. As shown in FIG. 7, the top sheet 12 includes a second paper base layer 31, a second resin film layer 32, and a second seal layer 33 in order of distance from the outer face side of the top sheet 12 when viewed as a part of the bag-like container 1. The top sheet 12 has no heating element layer, and is configured to transmit electromagnetic waves emitted by a microwave oven.

The second paper base layer 31 is made of a paper base material composed mainly of paper. For example, the second paper base layer 31 has one printed surface on the outer face side of the bag-like container 1, and this printed surface is overcoated with paint in order to secure a waterproofing property.

The second resin film layer 32 is provided on the second paper base layer 31, on the side closer to the inner face of the bag-like container 1. The second resin film layer 32 is made of, e.g., a PET film. The second resin film layer 32 may be a single layer or may have a multi-layered structure in which resin layers of the same kind or various kinds are stacked together. For the second resin film layer 32, for example a thermoplastic resin film made of, e.g., an olefin-based resin such as polyethylene or polypropylene, a polyester-based resin such as polyethylene terephthalate, or a polyamide-based resin such as nylon 6 is used.

The second resin film layer 33 is provided on the second resin film layer 32, on the side closer to the inner face of the bag-like container 1. Upon receipt of heat, the second seal layer 33 is bonded to the first seal layer 24. The second seal layer 33 is made of, e.g., a resin material having a thermal adhesion property. The second seal layer 33 is made of, e.g., a sealant film. A preferable example of a resin material that forms the second seal layer 33 made of a sealant film is an olefin-based resin such as a polyethylene resin or a polypropylene resin.

The seal portion 13 is formed by applying heat with the bottom sheet 11 and the top sheet 12 being in contact with each other, thereby bonding a part of the first seal layer 24 of the bottom sheet 11 and a part of the second seal layer 33 of the top sheet 12. The seal portion 13 is provided on the periphery of the bottom sheet 11 and the top sheet 12, along their shared four sides, in such a manner as to be inclined relative to their shared adjacent two sides in their share single corner. Specifically, the seal portion 13 is formed in a rectangular frame shape along the rectangular margin of each of the bottom sheet 11 and the top sheet 12. At the same time, the seal portion 13 has a relief portion 13a in one corner of each of the bottom sheet 11 and the top sheet 12 so as to serve as their shared unsealing base point, in a manner such that the relief portion 13a is inclined relative to the two adjacent sides of each of the bottom sheet 11 and the top sheet 12 so as to be relieved from the aforementioned corner.

The seal portion 13 seals the bottom sheet 11 and the top sheet 12 on their shared periphery with a strength that allows a user to separate the bottom sheet 11 and the top sheet 12 from each other. The seal portion 13 includes a weak seal portion 13b as a part thereof. For example, the weak seal portion 13b is included in a part of the heating portion 11a of the bottom sheet 11.

The relief portion 13a is formed by sealing the bottom sheet 11 and the top sheet 12 in such a manner as to avoid their shared single corner. In this corner of each of the bottom sheet 11 and the top sheet 12, a tap portion 15 is formed for a user to pick apart each of the bottom sheet 11 and the top sheet 12.

The weak seal portion 13b is set to break under a lower pressure than a pressure under which the bag-like container 1 breaks when the inner pressure of the bag-like container 1 increases by the action of steam. The weak seal portion 13b is configured to be smaller in width than the remaining part of the seal portion 13. For example, the weak seal portion 13b corresponds to a part of the seal portion 13 provided on the heating portion 11a, and is provided in one location of the center of the side on which the heating portion 11a is formed.

The steam release portion 14 is provided on the top sheet 12 or the seal portion 13, and is partially broken automatically or manually by a user at the time of cooking. In this manner, the steam release portion 14 releases steam that is generated when heating the content 100. For example, the steam release portion 14 corresponds to the weak seal portion 13b.

In the bag-like container 1 thus configured, the seal portion 13 is formed by heat-sealing the four sides of each of the bottom sheet 11 and the top sheet 12 in a manner such that the seal portion 13 is relieved from one of their shared corners, with the content 100 being arranged between the bottom sheet 11 and the top sheet 12. In this manner, the bag-like container 1 is formed into a bag shape in which the content 100 is contained.

Next described is one example of how the bag-like container 1 containing the content 100 is used. When microwave cooking is performed using the bag-like container 1, the top sheet 12 transmits electromagnetic waves, and the content 100 is irradiated to be cooked with the transmitted electromagnetic waves. Furthermore, the heating element layer 23 of the bottom sheet 11 is also irradiated with electromagnetic waves.

Irradiation of electromagnetic waves causes the heating element layer 23 to generate heat. Specifically, the heating portion 11a of the bottom sheet 11 generates heat, so that the surface of the content 100 in contact with this heating portion 11a is cooked and browned.

At the time of microwave cooking, when the inner pressure of the bag-like container 1 increases by the action of steam generated by the content 100, the weak seal portion 13b as the steam release portion 14 breaks, thereby forming a vent through which the inside and the outside are continuous. In this manner, steam inside the bag-like container 1 is discharged to the outside. Specifically, when the inner pressure increases, the bag-like container 1 can release the inner pressure, thereby making it possible to prevent the bag-like container 1 from breaking.

After microwave cooking, a user picks apart the tap portion 15 to separate the bottom sheet 11 and the top sheet 12 from each other, as shown in FIG. 4. This enables the cooked content 100 to be taken out. The bag-like container 1 is used as described above.

Next, an evaluation test for evaluating characteristics of the bottom sheet 11 used in the bag-like container 1 thus configured will be described along with evaluation results with reference to FIG. 8.

This evaluation test used, as the bottom sheet 11 according to the present embodiment, Examples 1 to 6 and Comparative Examples 1 and 2. In Examples 1 to 6, the first paper base layer 21 is formed on the outermost face side of the bag-like container 1. In Comparative Examples 1 and 2, a resin layer is formed on the outermost face side of the bag-like container 1, that is, the first resin film layer 22 is formed on the outermost face side outside the first paper base layer 21. Each of the examples and the comparative examples was configured as described below.

Example 1

The bottom sheet 11 according to Example 1 had a layered structure in which the first paper base layer 21, the first resin film layer 22, and the heating element layer 23 are provided in order from the outer face of the bag-like container 1 to the inner face thereof, without providing the first seal layer 24. For the first paper base layer 21, high-quality paper having a basis weight of 64 $g/cm^2$ was used. A material for the first resin film layer 22 had a double-layered structure made of PET. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to one layer of the first resin film layer 22 was used.

Example 2

The bottom sheet 11 according to Example 2 had a layered structure in which the first paper base layer 21, the first resin film layer 22, and the heating element layer 23 are provided in order from the outer face of the bag-like container 1 to the inner face thereof, without providing the first seal layer 24. For the first paper base layer 21, high-quality paper having a basis weight of 66 $g/cm^2$ was used. PET was used as a material for the first resin film layer 22. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to the first resin film layer 22 was used.

Example 3

The bottom sheet 11 according to Example 3 had a layered structure in which the first paper base layer 21, the first resin film layer 22, and the heating element layer 23 are provided in order from the outer face of the bag-like container 1 to the inner face thereof, without providing the first seal layer 24. For the first paper base layer 21, high-quality paper having a basis weight of 70 $g/cm^2$ was used. A material for the first resin film layer 22 had a triple-layered structure made of PE, PET, and PET. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to one layer of the first resin film layer 22 was used.

Example 4

The bottom sheet 11 according to Example 4 had a layered structure in which the first paper base layer 21, the first resin film layer 22, and the heating element layer 23 are provided in order from the outer face of the bag-like container 1 to the inner face thereof, without providing the first seal layer 24. For the first paper base layer 21, high-quality paper having a basis weight of 120 $g/cm^2$ was used. PET was used as a material for the first resin film layer 22. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to the first resin film layer 22 was used.

Example 5

The bottom sheet 11 according to Example 5 had a layered structure in which the first paper base layer 21, the first resin film layer 22, and the heating element layer 23 are provided in order from the outer face of the bag-like container 1 to the inner face thereof, without providing the first seal layer 24. For the first paper base layer 21, high-quality paper having a basis weight of 140 g/cm² was used. A material for the first resin film layer 22 had a triple-layered structure made of PE, PET, and PET. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to one layer of the first resin film layer 22 was used.

Example 6

The bottom sheet 11 according to Example 6 had a layered structure in which the first paper base layer 21, the first resin film layer 22, and the heating element layer 23 are provided in order from the outer face of the bag-like container 1 to the inner face thereof, without providing the first seal layer 24. For the first paper base layer 21, high-quality paper having a basis weight of 280 g/cm² was used. A material for the first resin film layer 22 had a double-layered structure made of PP and PET. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to one layer of the first resin film layer 22 was used.

Comparative Example 1

The bottom sheet according to Comparative Example 1 had a layered structure in which the first resin film layer 22, the first paper base layer 21, the first resin film layer 22, and the heating element layer 23 are provided in order from the outer face of the bag-like container 1 to the inner face thereof, without providing the first seal layer 24. That is, the first resin film layer 22 is provided on each of the faces of the first paper base layer 21. For the first paper base layer 21, high-quality paper having a basis weight of 35 g/cm² was used. PET was used as a material for the first resin film layer 22. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to one layer of the first resin film layer 22 was used.

Comparative Example 2

The bottom sheet according to Comparative Example 2 had a layered structure in which the first resin film layer 22, the first paper base layer 21, the first resin film layer 22, and the heating element layer 23 are provided in order from the outer face of the bag-like container 1 to the inner face thereof, without providing the first seal layer 24. That is, the first resin film layer 22 is provided on each of the faces of the first paper base layer 21. For the first paper base layer 21, high-quality paper having a basis weight of 66 g/cm² was used. PET was used as a material for the first resin film layer 22. For the heating element layer 23, a susceptor (1015HT manufactured by TORAY ADVANCED FILM CO., LTD.) in which a mixture of aluminum and aluminum oxide is evaporated to form a thin-film shape on a PET film corresponding to one layer of the first resin film layer 22 was used.

In the evaluation test, a pizza as the content 100 was placed directly on the bottom sheet 11 according to each of the examples and the comparative examples, without assembling the bottom sheet 11 into the bag-like container 1, and the pizza was cooked at 700 W for 2 minutes and 10 seconds using RE-TS3 manufactured by SHARP CORPORATION. A state of the bottom sheet 11 after cooking was evaluated, as was a browned surface of the pizza and its feel of crispiness as texture.

Examples in which a bottom surface of the pizza was browned are evaluated as "○". Examples in which a bottom surface of the pizza was slightly browned are evaluated as "Δ". Examples in which a bottom surface of the pizza was not browned are evaluated as "x". Examples in which the pizza exhibited crunchiness when it was eaten as a preferable feel of crispiness are evaluated as "○". Examples in which the pizza exhibited a feel of crispiness that was not preferable but not defective as a commercial product, in other words, examples in which the pizza was rather crispy, are evaluated as "Δ". Examples in which the pizza exhibited no feel of crispiness and was unfit for a commercial product are evaluated as "x".

Figure 8:
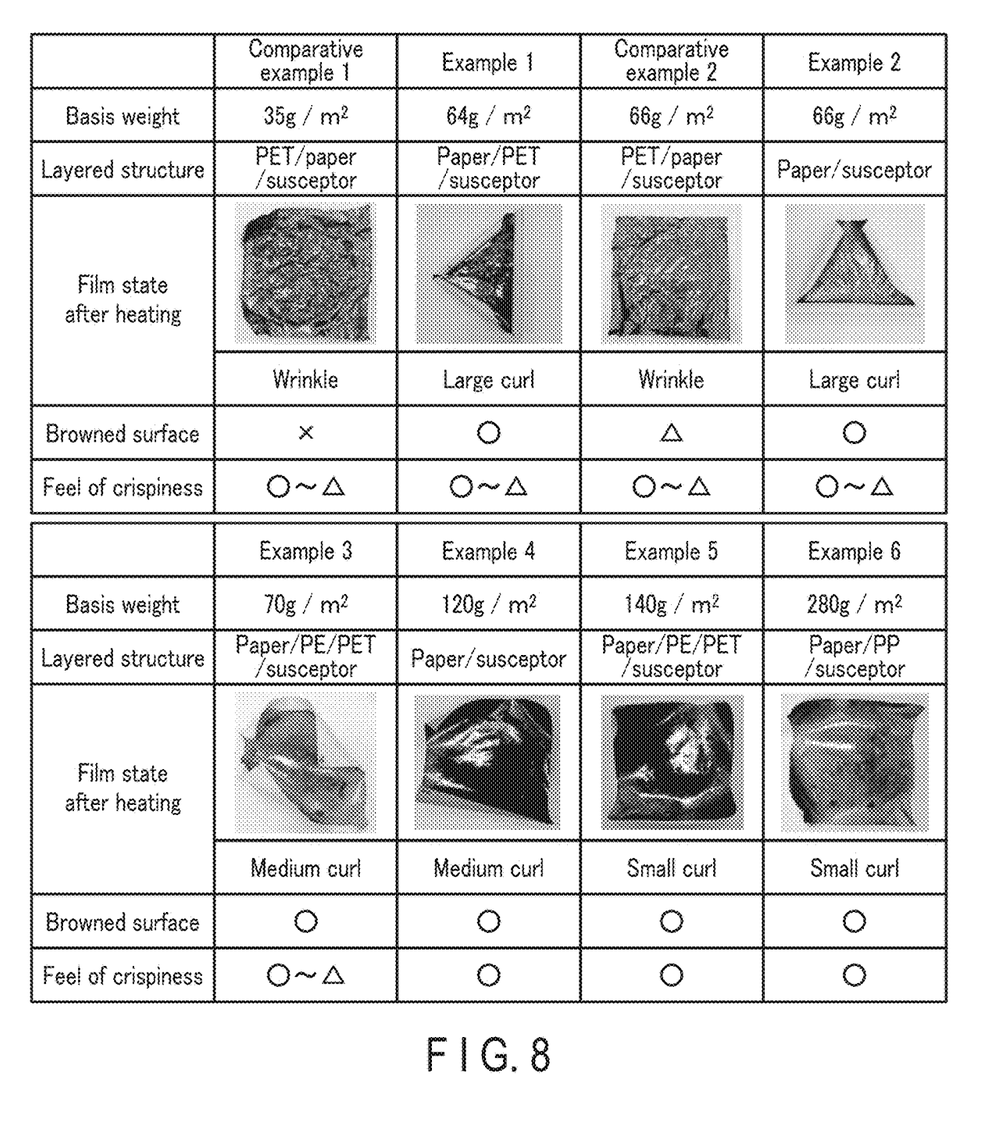
FIG. 8 is an explanatory drawing showing evaluation results of the bottom sheet of the bag-like container.

For a result of the evaluation test, as shown in FIG. 8, Comparative Examples 1 and 2 show that wrinkles occurred along the entire bottom sheet 11 at the time of cooking. This is because moisture contained in the first paper base layer 21 was evaporated, and steam generated by this evaporation caused partial interlayer separation between the first paper base layer 21 and the first resin film layer 22.

On the other hand, no wrinkles occurred in each of the examples in which the first paper base layer 21 was provided on the outermost face. However, in Examples 1 and 2, curls occurred in some corners and margins of the bottom sheet 11. In Examples 3 and 4, curls occurred in some corners and margins of the bottom sheet 11; however, the deformation amount was smaller than in Examples 1 and 2. In Examples 5 and 6, slight curls occurred in some corners and margins of the bottom sheet. The result shows a tendency for the curl amount to decrease as a basis weight of the first paper base layer 21 increases.

With respect to a browned surface, a surface of the pizza was not browned or, if it was browned, it was slightly browned in Comparative Examples 1 and 2. On the other hand, in each of the examples, a surface of the pizza was suitably browned. A possible cause for this is a gap between the pizza and the bottom sheet 11 due to the occurrence of wrinkles in Comparative Examples 1 and 2. On the other hand, in each of the examples, although curls occurred to a greater or lesser extent, an area on which the pizza was placed was not curled. This appears to be a reason why a surface of the pizza was suitably browned in each of the examples.

With respect to a feel of crispiness, crunchiness was exhibited in Examples 4 to 6. In Examples 1 to 3 and Comparative Examples 1 and 2, crunchiness or rather crunchiness was exhibited; however, a feel of crispiness was less than in Examples 4 to 6. The first paper base layer 21 having a larger basis weight is further improved in its heat insulation property, whereas the first paper base layer 21 having a smaller basis weight lets heat out of the heating element layer 23. This appears to be a reason why Examples 1 to 3 and Comparative Examples 1 and 2 exhibited less of a feel of crispiness than Examples 4 to 6. However, all the Examples and the Comparative Examples exhibited a feel of crispiness fit for a commercial product.

The result described above shows that it is preferable that the first paper base layer 21 be provided on the outermost face in order to prevent wrinkles from occurring in the bottom sheet 11 through cooking, and the formation of the first paper base layer 21 and the heating element layer 23 brings about a browned surface and a feel of crispiness. Furthermore, all the Examples and the Comparative Examples were free from any damage such as melting of the bottom sheet 11 due to heating of the heating element layer 23.

The bag-like container 1 thus configured can brown a surface of the content 100 with the heating element layer 23 by microwave cooking, and also bring about a feel of crispiness in accordance with the type of the content 100. Furthermore, the first paper base layer 21 included in the bottom sheet 11 improves the bottom sheet 11 in heat resistance as compared to a bottom sheet composed mainly of a resin film, not a paper material.

Thus, the bag-like container 1 is improved in heat resistance by providing the bottom sheet 11 including the heating element layer 23 with the first paper base layer 21 and the first resin film layer 22. This prevents the bottom sheet 11 from acquiring damage such as melting due to heat generated in the heating element layer 23 when heated.

The bag-like container 1 is configured in a manner such that the seal portion 13 is formed by heat-sealing the periphery of the bottom sheet 11 and the periphery of the top sheet 12. This configuration prevents the first resin film layer 22 in the seal portion 13 from thermally contracting when the first resin film layer 22 contracts by heat from microwave cooking.

The bag-like container 1 is configured in a manner such that both the bottom sheet 11 and the top sheet 12 include the paper base layers 21 and 31 and the resin film layers 22 and 32, while only the bottom sheet 11 includes the heating element layer 23. This achieves a balance between a strength and heat contraction of both sheets. As a result, the bag-like container 1 enables the bottom sheet 11 and the top sheet 12 to be deformed by approximately the same amount at the time of microwave cooking. As a result, curling of the bottom sheet 11 can be suppressed at the time of cooking, so that the deformation of the bottom sheet 11 can be prevented as much as possible.

Figure 9:
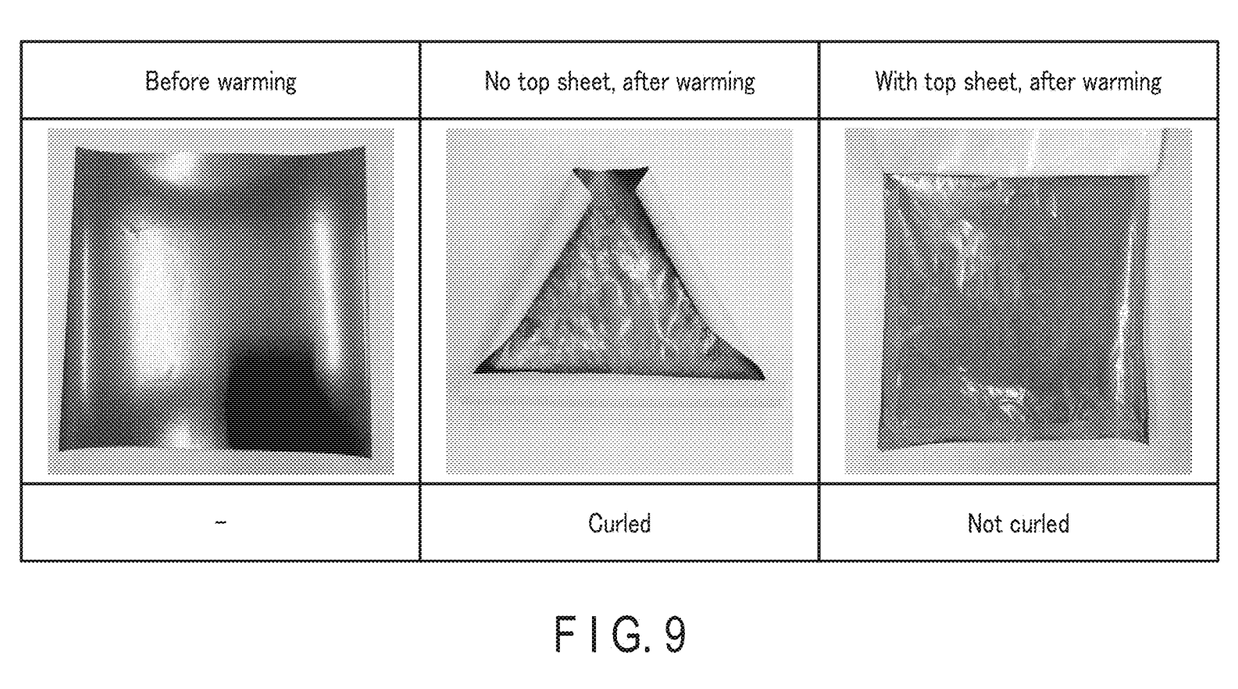
FIG. 9 is an explanatory drawing showing evaluation results of the bottom sheet of the bag-like container.

As a specific example, the results of the case in which the content 100 was cooked using only the bottom sheet 11 and the case in which the content 100 was cooked in the bag-like container 1 will be described with reference to FIG. 9. FIG. 9 shows: the bottom sheet 11 before cooking (warming) with a microwave oven; the bottom sheet 11 after the pizza as the content 100 that was placed directly on the bottom sheet 11 without fixing thereto was cooked (warmed) without using the top sheet 12; and the bottom sheet 11 from which the top sheet 12 was peeled off while its one side was left unpeeled after the pizza contained as the content 100 in the bag-like container 1 was cooked (warmed) therein. For this, the pizza was cooked at 700 W for 2 minutes and 10 seconds using RE-TS3 manufactured by SHARP CORPORATION. For the first paper base layer 21 and the second paper base layer 31 of both the bottom sheet 11 and the top sheet 12, high-quality paper (66 g/cm$^2$) was used.

As shown in the left side of FIG. 9, the bottom sheet 11 forms a sheet shape before warming. However, when the pizza was cooked using only the bottom sheet 11 without the top sheet 12, the bottom sheet 11 had curls in its corners and margins as shown in the center of FIG. 9. On the other hand, when the pizza was cooked using the bag-like container 1, the top sheet 12 had no curls in its corners and margins as shown in the right side of FIG. 9. As is clear from this, the configuration in which the bottom sheet 11 and the top sheet 12 have similar layered structures enables the bag-like container 1 to achieve a balance between a strength and heat contraction, and as much as possible prevent the bottom sheet 11 from deforming through microwave cooking.

With the configuration in which the bottom sheet 11 and the top sheet 12 respectively have the paper base layers 21 and 31 as the outermost face of the bag-like container 1, wrinkles can be prevented at the time of cooking. Specifically, for example, the bag-like container comprising a resin film layer as its outermost face has, as in Comparative Examples 1 and 2 shown in FIG. 8, corrugation that causes the bottom and top sheets to heat contract at the time of cooking. This is because steam generated by evaporation of moisture in the paper base layer causes partial interlayer separation between the paper base layer and the resin film layer. However, the bag-like container 1 according to the present embodiment comprises the paper base layers 21 and 31 as its outermost face releases the evaporated steam from the paper base layers 21 and 31, through their surfaces on the outer face side of the container, so that the aforementioned corrugation can be prevented.

Furthermore, the bag-like container 1 is configured in a manner such that the non-heating portion 11b without having the heating element layer 23 extends along each of the two opposed margins of the bottom sheet 11 formed as a rectangular shape. With the bag-like container 1 thus configured, the aforementioned margins each corresponding to the non-heating portion 11b can be set to be a lower temperature than the heating portion 11a. Specifically, with the bag-like container 1 thus configured, its margins each corresponding to the non-heating portion 11b can be prevented from increasing in temperature. As a result, the bag-like container 1 makes a user less likely to feel heat when he or she grasps a margin corresponding to the non-heating portion 11b after cooking.

Similarly, the bag-like container 1 is configured in a manner such that the tap portion 15 is provided on its one corner, and the non-heating portion 11b is provided on each of the two opposed margins of the bottom sheet 11. Therefore, at least a part of the tap portion 15 is positioned on the non-heating portion 11b, so that the vicinity of the tap portion 15 can be prevented from having a high temperature after microwave cooking. As a result, the bag-like container 1 can make a user less likely to feel heat when he or she grasps the tap portion 15. Thus, the bag-like container 1 can be easily opened.

Furthermore, the bag-like container 1 is configured in a manner such that each of the bottom sheet 11 and the top sheet 12 forms a rectangular shape in which the weak seal portion 13b is provided as the steam release portion 14 on the center of one side of the rectangular shape. This configuration enables steam to be released from the weak seal portion 13b when the inner pressure increases at the time of cooking. Therefore, the bag-like container 1 allows the aforementioned steam to be released through the center of one side of the bag-like container 1, that is, through the remainder of the bag-like container 1, other than its corners. This prevents a seal in a corner which is easily curled at the time of cooking from being peeled off, thereby being able to prevent the occurrence of a curl in the bottom sheet 11. In addition to the advantageous effect described above, the bag-like container 1 can be easily opened because the tap portion 15 positioned in one corner and the margins each positioned in the non-heating portion 11b are prevented from becoming hot due to steam.

As described above, the bag-like container 1 according to one embodiment of the present invention can be prevented from being damaged from heat generated by the heating element layer 23 when the content 100 is cooked with a microwave oven.

The present invention is not limited to the foregoing embodiment. For example, the bag-like container 1 explained above as one example is formed by heat-sealing the bottom sheet 11 and the top sheet 12 with the content 100 being arranged therebetween. However, the bag-like container 1 is not limited to this example. The bag-like container 1 may be formed into a bag shape by heat-sealing the three sides of both the bottom sheet 11 and the top sheet 12 in advance, with the one side being open. The bag-like container 1 formed in this way may be configured in a manner such that any content 100 is contained therein in homes and then the bag-like container 1 containing this content 100 is cooked with a microwave oven. The bag-like container 1 thus configured is usable for, for example, not only cooking the content 100 but also refrigerating or freezing the content 100 in homes.

In addition, the steam release portion 14 described above as one example is composed of the weak seal portion 13*b* that is formed by making a width of one part of the seal portion 13 smaller than the remaining part of the seal portion 13. For example, the steam release portion 14 may be formed in a manner such that the weak portion 13*b* is formed by applying a parting agent to a part of the seal portion 13. The steam release portion 14 may be formed by providing the top sheet 12 with a vulnerable portion that breaks when the inner pressure of the bag-like container 1 increases at the time of cooking, or may be formed by providing in advance the top sheet 12 with a hole for releasing steam, sealing this hole with a seal, etc. at the time of distribution of the bag-like container 1 containing the content 100 as a commercial product, and letting a user tear off this seal at the time of cooking. The steam release portion 14 described above as one example is formed on a part of the heating portion 11*a* of the bottom sheet 11. However, the steam release portion 14 is not limited to this example, and may be formed on the non-heating portion 11*b*.

The heating portion 11*a* of the bottom sheet 11 described above as one example is provided throughout the face of the bottom sheet 11, except for the two opposed sides. However, the heating portion 11*a* is not limited to this example. The heating portion 11*a* may be formed into a desired browned shape, or may be formed partially in the bag-like container 1 depending on the content 100 contained therein so that the necessary heating amount can be produced.

Specifically, the present invention is not limited to the above-described embodiments, and can be appropriately modified in practice, without departing from the gist of the invention. The respective embodiments can be carried out in combination as appropriate, and in such a case, the combined effects can be obtained. Furthermore, the above-described embodiments include inventions at various stages, and various inventions are extracted by appropriately combining the disclosed structural elements. For example, even if some structural elements are deleted from the disclosed structural elements, the resultant structure can be extracted as an invention as long as a problem can be solved and an effect can be obtained.

What is claimed is:

1. A bag-like container comprising:
   a bottom sheet including a first paper base layer and a heating element layer configured to generate heat by absorbing electromagnetic waves, the first paper base layer being formed on an outermost face side;
   a top sheet bonded to the bottom sheet in such a manner as to be separable from the bottom sheet with a content to be cooked being contained, wherein the top sheet transmits the electromagnetic waves and wherein:
   the bottom sheet includes a first seal layer provided on the heating element layer;
   the top sheet includes a second seal layer provided on a resin film layer, the second seal layer being thermally bonded to the first seal layer;
   the bag-like container includes a seal portion provided along a periphery of the bottom sheet and the top sheet, the seal portion being configured to heat-seal the first seal layer and the second seal layer, wherein the seal portion is defined by the heat seal between the first seal layer and the second seal layer;
   the bottom sheet and the top sheet being a rectangular shape;
   the bottom sheet includes a non-heating portion provided along two opposed sides along the periphery outside of the heating element layer, wherein the non-heating portion transmits the electromagnetic waves;
   a steam release portion provided at a center of one of two opposed sides of the periphery in which the heating element layer is provided, the two opposed sides being different from the two opposed sides along which the non-heating portion is provided;
   wherein the steam release portion is provided on a part of the seal portion, and is a weak seal portion smaller in width than a remaining part of the seal portion; and.

2. The bag-like container according to claim 1, wherein the top sheet includes a second paper base layer provided on an outermost face side.

3. The bag-like container according to claim 2, wherein:
   the bottom sheet includes a first resin film layer provided between the first paper base layer and the heating element layer; and
   the top sheet includes a second resin film layer provided on the second paper base layer.

4. The bag-like container according to claim 1, wherein a part of the seal portion includes a relief portion configured to form an unsealing base point for the bottom sheet and the top sheet, to be arranged at the non-heating portion, and to be placed in one corner of each of the bottom sheet and the top sheet in such a manner as to be inclined relative to two adjacent sides in the corner.

* * * * *